United States Patent
Im et al.

(10) Patent No.: US 9,145,725 B2
(45) Date of Patent: Sep. 29, 2015

(54) APPARATUS FOR OPENING AND CLOSING TRUNK FOR VEHICLE

(71) Applicants: Hyundai Motor Company, Seoul (KR); Kia Motors Corp., Seoul (KR)

(72) Inventors: Yong Hyuck Im, Seoul (KR); Min Hyung Byun, Seoul (KR); Jong Wook Hong, Suwon-si (KR)

(73) Assignees: HYUNDAI MOTOR COMPANY, Seoul (KR); KIA MOTORS CORP., Seoul (KR)

( * ) Notice: Subject to any disclaimer, the term of this patent is extended or adjusted under 35 U.S.C. 154(b) by 0 days.

(21) Appl. No.: 14/292,534

(22) Filed: May 30, 2014

(65) Prior Publication Data
US 2015/0075305 A1    Mar. 19, 2015

(30) Foreign Application Priority Data
Sep. 13, 2013    (KR) .................. 10-2013-0110725

(51) Int. Cl.
  *B62D 25/10*    (2006.01)
  *E05F 15/12*    (2006.01)
  *F16H 25/12*    (2006.01)
  *F16H 25/20*    (2006.01)

(52) U.S. Cl.
  CPC ............ *E05F 15/12* (2013.01); *F16H 25/12* (2013.01); *F16H 25/20* (2013.01); *F16H 2025/2075* (2013.01)

(58) Field of Classification Search
  CPC ......... F16H 15/12; F16H 25/12; F16H 25/20; F16H 2025/2075
  See application file for complete search history.

(56) References Cited

U.S. PATENT DOCUMENTS

| 2009/0113803 A1 | 5/2009 | Arenz |
| 2012/0000304 A1 | 1/2012 | Hamminga et al. |
| 2012/0096963 A1* | 4/2012 | Hung .................... 74/89.38 |

FOREIGN PATENT DOCUMENTS

KR    10-2011-0028920 A    3/2011

\* cited by examiner

*Primary Examiner* — Lori L Lyjak
(74) *Attorney, Agent, or Firm* — Morgan, Lewis & Bockius LLP

(57) ABSTRACT

An apparatus for opening and closing a trunk for a vehicle, may include a motor unit equipped with a motor, an inner tube provided outside the motor unit to surround the motor unit, with a plurality of protrusions protruding from an outer circumference of the inner tube, an outer tube provided outside the inner tube to surround the inner tube and including a threaded groove being indented along an inner circumference of the outer tube, a bar-shaped spindle having a threaded portion on an outer circumference thereof, and coupled to the motor unit to cause the threaded portion of the spindle to engage with the threaded groove of the outer tube when the motor may be rotated, thus allowing the spindle to perform translation simultaneously with rotation, and an elastic member-wound on an outer circumference of the outer tube.

9 Claims, 5 Drawing Sheets

APPARATUS FOR OPENING AND CLOSING TRUNK FOR VEHICLE

CROSS-REFERENCE(S) TO RELATED APPLICATION

The present application claims priority to Korean Patent Application No. 10-2013-0110725 filed on Sep. 13, 2013, the entire contents of which is incorporated herein for all purposes by this reference.

BACKGROUND OF THE INVENTION

1. Field of the Invention

The present invention relates, in general, to an apparatus for opening and closing a trunk for a vehicle, and, more particularly, to an apparatus for opening and closing a trunk for a vehicle, which is capable of providing a larger space to the trunk.

2. Description of Related Art

In a conventional apparatus for opening and closing a trunk for a vehicle, a hinge arm and a torsion bar are a technology that is widely being used in a current vehicle. Since vehicle users are interested in trunk space, the trunk space has marketability. Thus, vehicle makers make many efforts to enlarge the trunk space of a vehicle.

Korean Patent Laid-Open Publication No. 10-2011-0028920 A has been proposed, which is entitled "Apparatus for Automatically Opening and Closing Trunk Lid for Vehicle". The apparatus includes a tube part, a driving part, and a connecting part, and is formed in a "U" shape, thus making it convenient to open and close the trunk of the vehicle. The tube part moves a goose-neck using the rotating force of a spindle. The driving part transmits power to rotate the spindle, and is spaced apart from a lower end of a side of the tube part. The connecting part structurally connects the tube part to the driving part, and transmits power from the driving part to the tube part.

However, the conventional apparatus for opening and closing the trunk for the vehicle is problematic in that it uses the hinge arm and the torsion bar, so that the hinge arms undesirably occupies the luggage space when the trunk is closed. Further, the torsion bar may be damaged by a luggage loaded in the luggage space.

Furthermore, recently, a midsize vehicle was configured so that a gas lift is installed outside the luggage space. Such a configuration ensures luggage space but is complex, thus increasing material cost and the number of assembling processes.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for opening and closing a trunk for a vehicle, which is simple in structure, is convenient in operation, and ensures a sufficient loading space in the trunk.

In an aspect of the present invention, an apparatus for opening and closing a trunk for a vehicle may include a motor unit equipped with a motor, an inner tube provided outside the motor unit to surround the motor unit, with a plurality of protrusions protruding from an outer circumference of the inner tube, an outer tube provided outside the inner tube to surround the inner tube and including a threaded groove being indented along an inner circumference of the outer tube, a bar-shaped spindle having a threaded portion on an outer circumference thereof, and coupled to the motor unit to cause the threaded portion of the spindle to engage with the threaded groove of the outer tube when the motor is rotated, thus allowing the spindle to perform translation simultaneously with rotation, and an elastic member wound on an outer circumference of the outer tube.

The motor unit is coupled to the inner tube in such a way as to be in close contact with an inner surface of the inner tube, thus preventing the motor unit from being removed from the inner tube when the motor is rotated.

A length of the inner tube is shorter than a length of the outer tube.

The inner tube is coupled to the outer tube in such a way as to be in close contact with the outer tube.

The inner tube is coupled to the outer tube in such a way as to be in close contact therewith, so that the protrusions of the inner tube support the outer tube when the motor is rotated, thus preventing the outer tube from rotating.

The outer tube is made of a flexible material, so that the outer tube varies in length during the translation of the spindle.

The outer tube may have on each of opposite ends thereof a cap-shaped cover, and a hook is provided on the cover in such a way as to pass therethrough, so that the outer tube is coupled to a vehicular body via the hook.

A first end of the outer tube is coupled to a rear side of a rear seat, and a second end of the outer tube is coupled to a lid hinge of the trunk.

The plurality of protrusions is aligned in an axial direction of the inner tube and wherein the outer tube is slidably engaged with the plurality of protrusions of the inner tube.

As is apparent from the above description, the apparatus for opening and closing the trunk is advantageous in that the threaded groove is formed on the inner circumference of the outer tube, the outer diameter of the spindle is formed to be equal to the inner diameter of the outer tube, the threaded portion of the spindle engages with the threaded groove of the outer tube, thereby a nut gear assembly and a spring guide tube in the apparatus for opening and closing the trunk can be obviated unlike in the related art, so that the structure is simple and manufacturing cost is reduced.

Further, the apparatus for opening and closing the trunk is advantageous in that the spindle having a diameter larger than that of the conventional spindle can be used, so that the contact area of the spindle with the outer tube is large and thereby stress per contact area is reduced when the same load is applied, therefore increasing the durability of parts, and in that the translational distance of the spindle is increased when the motor rotates once, so that the motor can be operated at RPM that is reduced by ½ or more as compared to the conventional RPM, and thereby noise can be reduced and the durability of the motor can be enhanced, and in that the total length of the parts can be shortened by about 138 mm as compared to the conventional length, so that the mounting of the apparatus for opening and closing the trunk can be shifted to the front of the vehicle, and thereby the space utilization of the trunk room can be increased.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
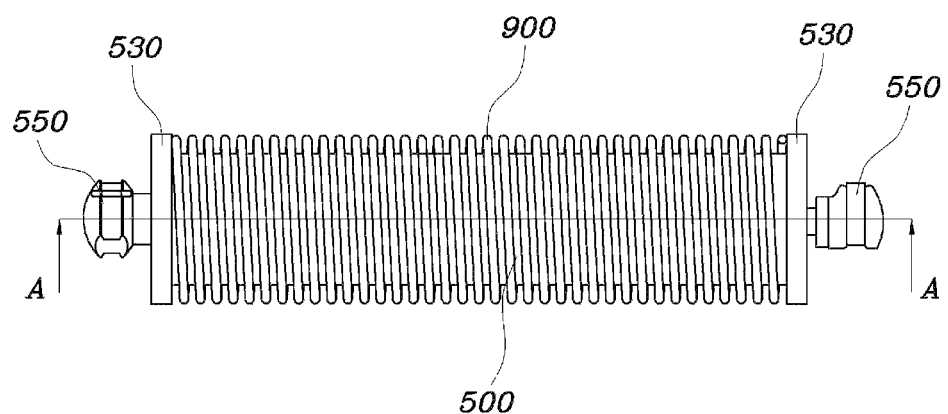
FIG. 1 is a view showing an apparatus for opening and closing a trunk for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, the apparatus for opening and closing the trunk for the vehicle according to the preferred embodiment of the present invention will be described with reference to the accompanying drawings.

Figure 2:
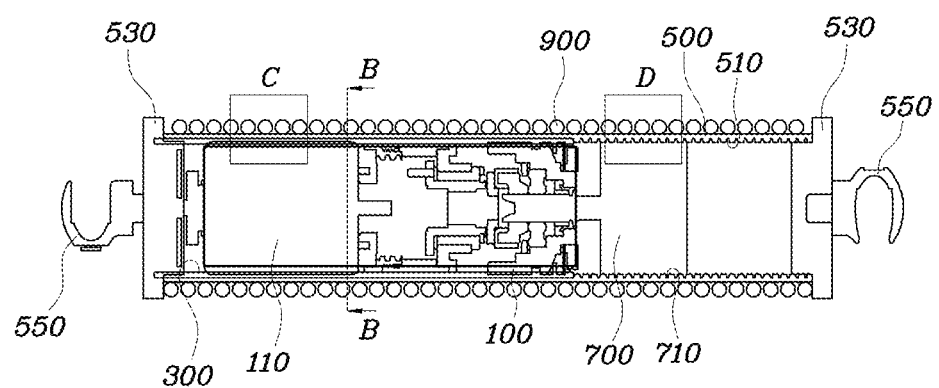
FIG. 2 is a sectional view taken along line A-A of FIG. 1.
Figure 3:
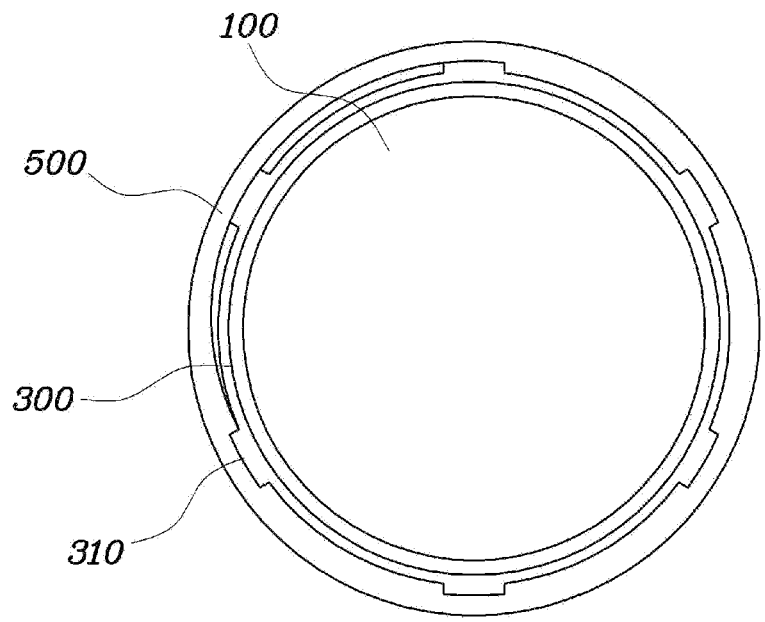
FIG. 3 is a sectional view taken along line B-B of FIG. 2.
Figure 4:
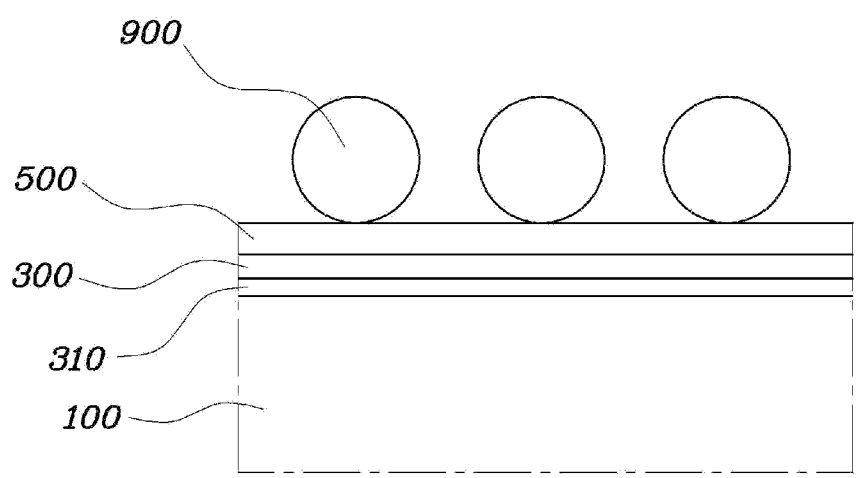
FIG. 4 is a detailed view showing portion C of FIG. 2.
Figure 5:
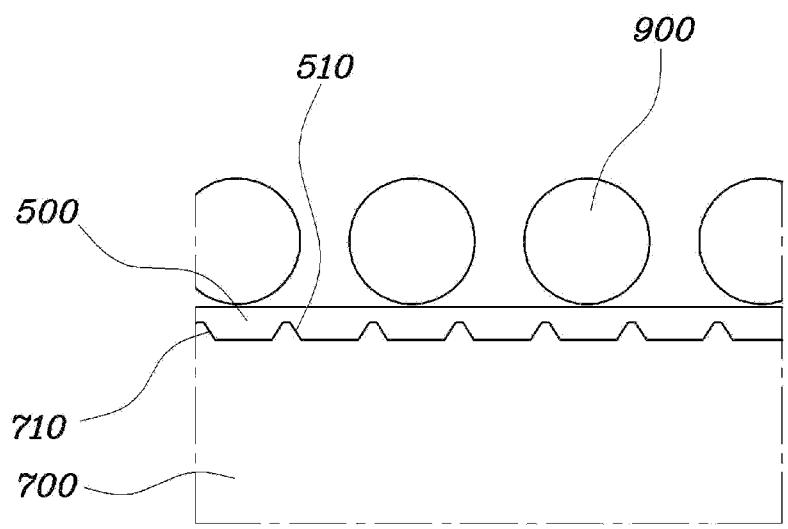
FIG. 5 is a detailed view showing portion D of FIG. 2.
Figure 6:
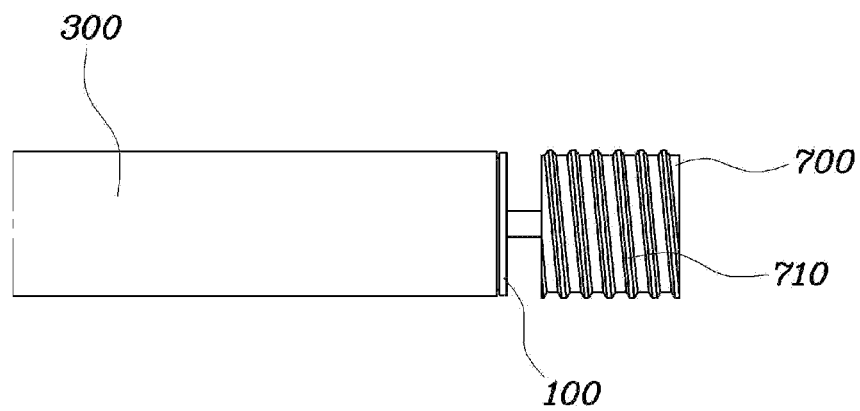
FIG. 6 is a detailed view showing a motor unit and a spindle.
Figure 7:
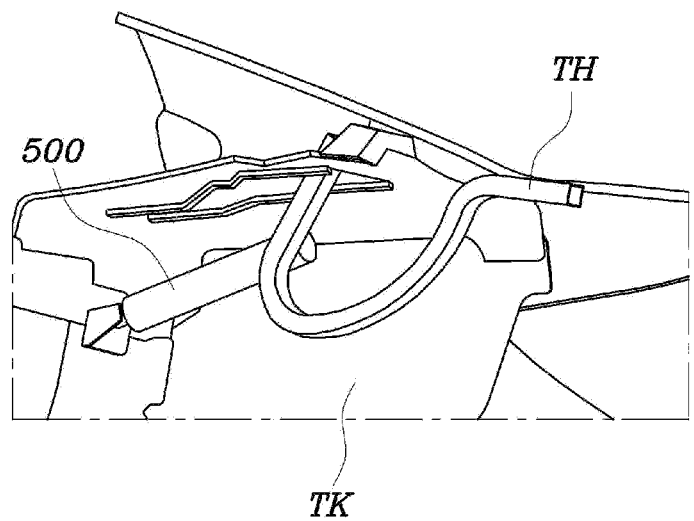
FIG. 7 is a view showing the apparatus for opening and closing the trunk when the trunk is closed.
Figure 8:
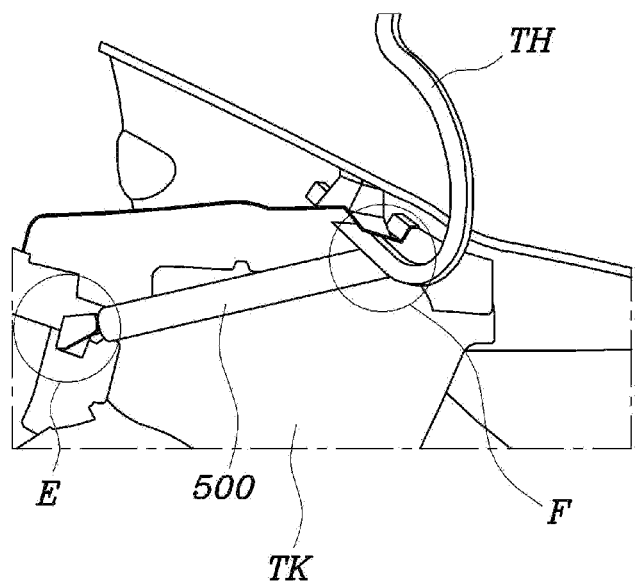
FIG. 8 is a view showing the apparatus for opening and closing the trunk when the trunk is opened.
Figure 9:
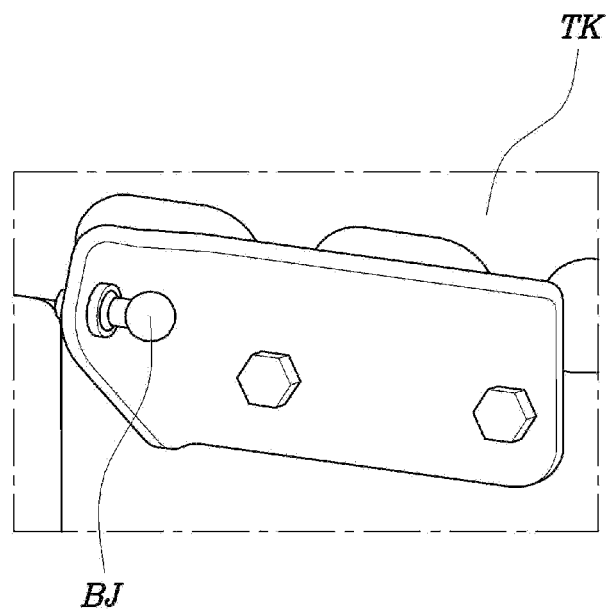
FIG. 9 is a detailed view showing portion E of FIG. 8.
Figure 10:
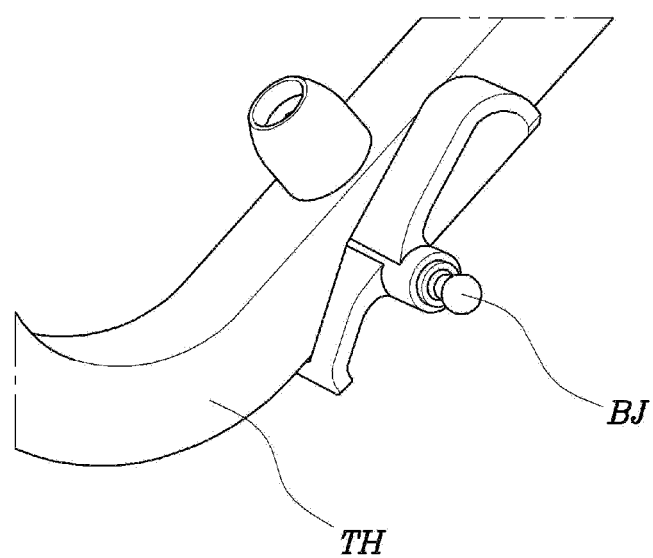
FIG. 10 is a detailed view showing portion F of FIG. 8.

FIG. 1 is a view showing an apparatus for opening and closing a trunk for a vehicle according to an exemplary embodiment of the present invention, FIG. 2 is a sectional view taken along line A-A of FIG. 1, FIG. 3 is a sectional view taken along line B-B of FIG. 2, FIG. 4 is a detailed view showing portion C of FIG. 2, FIG. 5 is a detailed view showing portion D of FIG. 2, FIG. 6 is a detailed view showing a motor unit 100 and a spindle 700. Further, FIG. 7 is a view showing the apparatus for opening and closing the trunk when the trunk is closed, FIG. 8 is a view showing the apparatus for opening and closing the trunk when the trunk is opened, FIG. 9 is a detailed view showing portion E of FIG. 8, and FIG. 10 is a detailed view showing portion F of FIG. 8.

The apparatus for opening and closing the trunk according to the exemplary embodiment of the present invention includes a motor unit 100 equipped with a motor 110. An inner tube 300 is provided outside the motor unit 100 to surround the motor unit 100, with a plurality of protrusions 310 protruding from an outer circumference of the inner tube 300. An outer tube 500 is provided outside the inner tube 300 to surround the inner tube 300, with a threaded groove 510 being indented along an inner circumference of the outer tube 500. A bar-shaped spindle 700 has a threaded portion 710 on an outer circumference thereof, and is coupled to the motor unit 100 to cause the threaded portion 710 to engage with the threaded groove 510 of the outer tube 500 when the motor 110 is rotated, thus allowing the spindle 700 to perform translation simultaneously with rotation. An elastic member 900 is wound on the outer circumference of the outer tube 500.

The inner tube 300 and the outer tube 500 are made of a material having some flexibility and friction. Thus, the motor unit 100 is coupled to the inner surface of the inner tube 300 in such a way as to be in close contact therewith, so that the motor unit 100 and the inner tube 300 are rigidly fastened to each other by a frictional force even when the motor 110 rotates, thus preventing the motor unit 100 from being removed from the inner tube 300.

Referring to FIGS. 4 and 5, it can be seen that portion C of FIG. 2 is formed by the motor unit 100, the inner tube 300 provided outside the motor unit 100 to surround it, and the outer tube 500 provided outside the inner tube 300 to surround it. Further, in portion D of FIG. 2 can be seen only the outer tube 500 having the threaded groove 510 that is formed on a contact surface between the outer tube 500 and the spindle 700. That is, a length of the inner tube 300 is shorter than that of the outer tube 500, so that the inner tube 300 surrounds only the motor unit 100. The outer tube 500 is coupled to an outer surface of the inner tube 300 in such a way as to be in close contact therewith, thus preventing the motor unit 100, the inner tube 300 and the outer tube 500 from being separated from each other even when the motor 110 rotates, therefore allowing the spindle 700 to translate back and forth while simultaneously rotating.

The inner tube 300 is coupled to the outer tube 500 in such a way as to be in close contact therewith. Thereby, when the motor 110 rotates, the protrusion 310 of the inner tube 300 supports the outer tube 500, thus preventing the outer tube 500 from rotating even when the motor 110 and the spindle 700 rotate. Further, the threaded portion 710 of the spindle 700 engages with the threaded groove 510 of the outer tube 500, so that the spindle 700 can perform translation simultaneously with rotation.

Furthermore, the outer tube 500 is made of a flexible material. Thus, when the trunk TK is opened, the outer tube 500 and the elastic member 900 wound on the outer circumference of the outer tube 500 are extended. Meanwhile, when the trunk TK is closed, the elastic member 900 and the outer tube 500 are contracted to be restored to their original positions.

Cap-shaped covers 530 are provided on opposite ends of the outer tube 500 to completely seal the outer tube 500. A hook 550 is provided on each cover 530 in such a way as to pass therethrough, so that the outer tube 500 is coupled to a vehicular body via the hook 550. To be more specific, one end of the outer tube 500 is coupled to a rear side of a rear seat via a ball joint BJ, while another end is coupled to a trunk lid hinge TH via a ball joint BJ. Thereby, when the trunk TK is opened, the motor 110 of the motor unit 100 rotates, thus leading to the rotation of the spindle 700. In this case, the outer tube 500 and the elastic member 900 are extended, thus pushing the trunk lid hinge TH up and opening the trunk TK. The assembly is also carried out using a ball socket as in a method of assembling a gas lift.

As described above, the present invention provides an apparatus for opening and closing a trunk, in which a threaded groove is formed on an inner circumference of an outer tube, an outer diameter of a spindle is formed to be equal to an inner diameter of the outer tube, a threaded portion of the spindle engages with the threaded groove of the outer tube, and a nut gear assembly and a spring guide tube can be obviated unlike the related art, so that a structure is simple and manufacturing cost is reduced.

Further, the present invention provides an apparatus for opening and closing a trunk, in which a spindle having a diameter larger than that of a conventional spindle can be used, so that a contact area of the spindle with an outer tube is large and thereby stress per contact area is reduced when the same load is applied, therefore increasing the durability of parts, and in which the translational distance of the spindle is increased when a motor rotates once, so that the motor can be operated at RPM that is reduced by ½ or more as compared to the conventional RPM, and thereby noise can be reduced and the durability of the motor can be enhanced, and in which the total length of the parts can be shortened by about 138 mm as compared to the conventional length, so that the mounting of the apparatus for opening and closing the trunk can be shifted to the front of the vehicle, and thereby the space utilization of a trunk room can be increased.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for opening and closing a trunk for a vehicle, comprising:
    a motor unit equipped with a motor;
    an inner tube provided outside the motor unit to surround the motor unit, with a plurality of protrusions protruding from an outer circumference of the inner tube;
    an outer tube provided outside the inner tube to surround the inner tube and including a threaded groove being indented along an inner circumference of the outer tube;
    a bar-shaped spindle having a threaded portion on an outer circumference thereof, and coupled to the motor unit to cause the threaded portion of the spindle to engage with the threaded groove of the outer tube when the motor is rotated, thus allowing the spindle to perform translation simultaneously with rotation; and
    an elastic member wound on an outer circumference of the outer tube.

2. The apparatus as set forth in claim 1, wherein the motor unit is coupled to the inner tube in such a way as to be in close contact with an inner surface of the inner tube, thus preventing the motor unit from being removed from the inner tube when the motor is rotated.

3. The apparatus as set forth in claim 1, wherein a length of the inner tube is shorter than a length of the outer tube.

4. The apparatus as set forth in claim 1, wherein the inner tube is coupled to the outer tube in such a way as to be in close contact with the outer tube.

5. The apparatus as set forth in claim 1, wherein the inner tube is coupled to the outer tube in such a way as to be in close contact therewith, so that the protrusions of the inner tube support the outer tube when the motor is rotated, thus preventing the outer tube from rotating.

6. The apparatus as set forth in claim 1, wherein the outer tube is made of a flexible material, so that the outer tube varies in length during the translation of the spindle.

7. The apparatus as set forth in claim 1, wherein the outer tube has on each of opposite ends thereof a cap-shaped cover, and a hook is provided on the cover in such a way as to pass therethrough, so that the outer tube is coupled to a vehicular body via the hook.

8. The apparatus as set forth in claim 1, wherein a first end of the outer tube is coupled to a rear side of a rear seat, and a second end of the outer tube is coupled to a lid hinge of the trunk.

9. The apparatus as set forth in claim 1, wherein the plurality of protrusions are aligned in an axial direction of the inner tube and wherein the outer tube is slidably engaged with the plurality of protrusions of the inner tube.

* * * * *